United States Patent
Cook (10) Patent No.: US 10,310,790 B1
(45) Date of Patent: Jun. 4, 2019

(54) SYSTEM AND METHODS FOR REDUCING COMPONENT WEAR IN AN IMAGING DEVICE

(71) Applicant: Lexmark International, Inc., Lexington, KY (US)

(72) Inventor: William Paul Cook, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 15/825,210

(22) Filed: Nov. 29, 2017

(51) Int. Cl.
  *G06F 3/12* (2006.01)
  *G06K 15/02* (2006.01)
  *B41J 29/393* (2006.01)

(52) U.S. Cl.
  CPC .......... *G06F 3/1263* (2013.01); *G06F 3/1267* (2013.01); *G06K 15/186* (2013.01); *B41J 29/393* (2013.01)

(58) Field of Classification Search
  CPC ... G06F 3/1263; G06F 3/1267; G06K 15/186; B41J 29/393
  USPC ........................................................ 358/1.15
  See application file for complete search history.

(56) References Cited

U.S. PATENT DOCUMENTS

| 2008/0174802 | A1* | 7/2008 | Sampath | G03G 15/55 358/1.13 |
| 2012/0157275 | A1* | 6/2012 | Peters | B65H 27/00 492/9 |
| 2014/0168307 | A1* | 6/2014 | Silveston-Keith | B41J 11/009 347/16 |
| 2014/0232778 | A1* | 8/2014 | Edwards | B65H 5/062 347/16 |
| 2016/0004193 | A1* | 1/2016 | Murrell | H04N 1/00724 399/67 |

* cited by examiner

*Primary Examiner* — Allen H Nguyen (57) ABSTRACT

An imaging system including a method for reducing component wear in an imaging device which includes receiving a print job in the imaging device, generating an image for each page of the print job, printing each image, determining whether an image generation during at least one of the receiving, the generating, and the printing is slow, and upon a positive determination, disabling one or more functions in the imaging device to adjust a default printing performance of the imaging device, wherein the one or more functions include an advanced start function and a smart-run out function stored in a memory of the imaging device for achieving the default printing performance.

5 Claims, 6 Drawing Sheets

SYSTEM AND METHODS FOR REDUCING COMPONENT WEAR IN AN IMAGING DEVICE

CROSS REFERENCE TO RELATED APPLICATIONS

This patent application is related to the U.S. patent application Ser. Nos. 15/825,659 and 15/825,681, both entitled "System and Methods for Reducing Component Wear in an Imaging Device," and which are filed contemporaneously herewith and assigned to the assignee of the present application.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present invention relates to a system and methods for reducing component wear in imaging devices and, more particularly, to a system and methods for reducing component wear in an imaging device by adjusting the printing performance of the imaging device.

2. Description of the Related Art

Upon the completion of printing a print job, a print engine of an imaging device typically shuts down, stopping all motors and turning off high voltage supplies. When another print job is in the print queue after printing a print job, the print engine is restarted. The imaging device may be configured to start the print engine following the receipt of a print job in the imaging device. In addition, the print engine may be prevented from shutting down following the completion of a print job while another print job is being processed into a printable format by a raster image processor (RIP).

Since it is possible for the RIP to take time in generating a printable image for the print engine, the print engine may wait for a relatively long time for an image to be available prior to starting printing. There may be various reasons for the delay, such as, but not limited to, job complexity, job size, poor network quality or host communication, and/or formatting problems. In other scenarios, print data may be lacking or lost as the print job is transmitted over a network such that the print job will not be printed. As a consequence of the print engine operating while images are being generated by the RIP, excessive churn may be incurred in the imaging device, which wears out printing components and uses up supplies within the device faster. Technical support is often requested to change settings in the imaging device until a minimal amount of churn remains.

Accordingly, it is desirable to have a system and methods for reducing component wear in an imaging device. There also exists a need for automatically adjusting functions in the imaging device based on the detected churn and reducing the component wear.

SUMMARY

A system and methods for reducing component wear in an imaging device are disclosed. The disclosed imaging device includes a controller having an associated memory, a raster image processor and a print engine.

In one example embodiment, the method includes receiving a print job in the imaging device, generating an image for each page of the print job, printing each image, determining whether an image generation during at least one of the receiving, the generating, and the printing is slow, and upon a positive determination, disabling one or more functions in the imaging device to adjust a default printing performance of the imaging device. The one or more functions may include a function for adjusting a time to first print in the imaging device and a function for adjusting a number of throughputs in the imaging device.

In another example embodiment, the method includes receiving an electronic document including one or more pages, rasterizing each of the one or more pages and queueing each of the one or more pages for printing following the rasterizing, determining whether each of the receiving and the rasterizing is performed successfully, and upon a negative determination, slowing down a default printing performance of the imaging device until a predetermined number of times that each of the receiving and the rasterizing is performed successfully.

The abovementioned methods may be performed by a controller of the imaging device. Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included or substituted for those of others. The scope of the disclosure encompasses the appended claims and all available equivalents. The following description is therefore, not to be taken in a limited sense, and the scope of the present disclosure is defined by the appended claims.

Also, it is to be understood that the phraseology and terminology used herein is for the purpose of description and should not be regarded as limiting. The use herein of "including", "comprising", or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions, and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed is a system and different methods for reducing component wear in an imaging device. Since component wear is hastened by excess churn in the imaging device, methods for reducing component wear include methods for reducing excess churn in the imaging device. For purposes of the present disclosure, churn refers to the state of operating the imaging device with the motors running while utilizing imaging supplies having toner. An imaging supply (e.g., toner cartridge, imaging unit containing photoconductive members and toner development rollers) that is exposed to excessive churn may not meet an expected life goal due to print quality problems that occur because of the churn. In one example scenario, toner may be pressed through a nip and generate a charge. However, when toner is not transferred to a media sheet, it is recycled through the imaging supply and charged again. Following many cycles through the imaging supply, toner may heat up, deform, and may not charge properly, causing print quality problems. To reduce churn in the imaging device, a preset printing performance, which refers to a time-to first-print and a number of throughputs that the imaging device is capable of achieving, is thus reduced.

Figure 1:
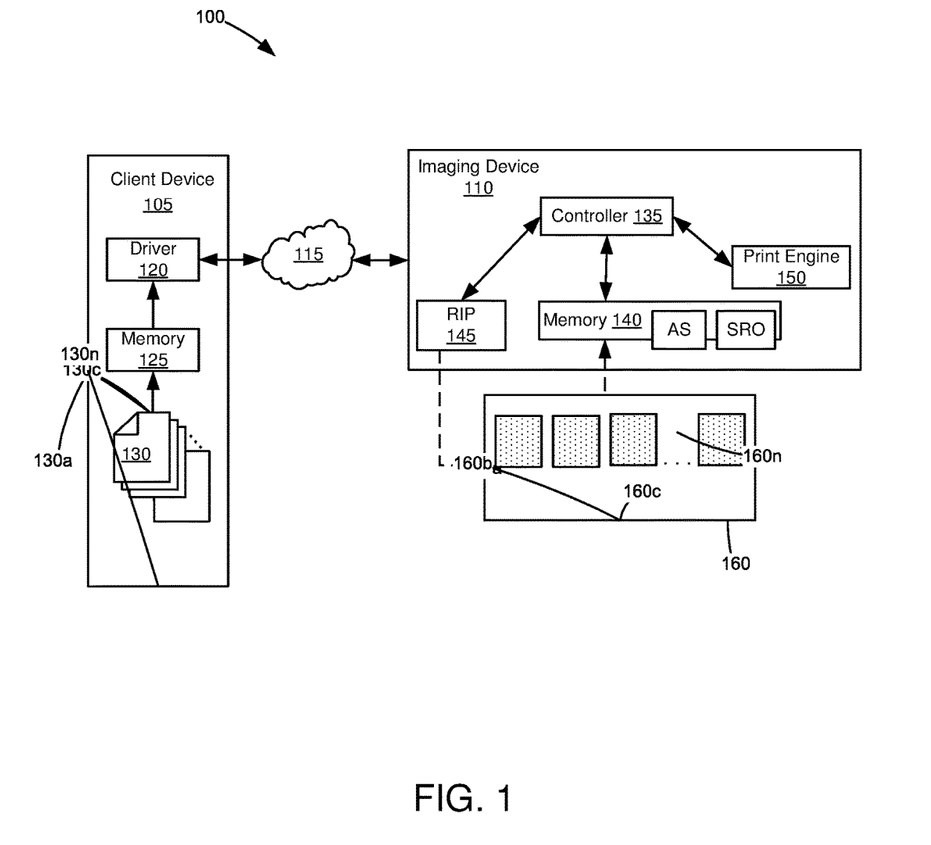
FIG. 1 is an imaging system, according to one example embodiment.

FIG. 1 shows an imaging system 100 according to one example embodiment. Imaging system 100 includes a client device 105 and an imaging device 110 communicatively connected to each other through a network 115. Client device 105 includes an imaging driver 120 and a memory 125 for storing a print job 130 having one or more pages 130a-130n. Imaging device 110 includes a controller 135 having an associated memory 140, a raster image processor (RIP) 145, and a print engine 150.

Client device 105 includes imaging driver 120 for allowing communications between client device 105 and imaging device 110. Imaging driver 120 may be a printer/scanner driver software program for imaging device 110. Client device 105 may be any computing device capable of generating a print job and may be, but is not limited to, a computer, smartphone, tablet, smartwatch, etc. One or more print jobs 130 may be created and stored in client device 105. Each print job 130 may include one or more pages 130a-130n, such as pages 130a, 130b, 130c, 130n as shown in FIG. 1, where n represents the total number of pages in the print job. It will also be appreciated by those skilled in the art that while one client device 105 and one imaging device 110 are shown in FIG. 1, multiple client devices 105 and/or multiple imaging devices 110 may be present in imaging system 100 and communicatively coupled via network 115.

Imaging device 110 may be a single function printer or a multifunction machine (sometimes referred to as an all-in-one device) capable of printing, scanning, making copies, e-mailing and/or other functions. Imaging device 110 may be communicatively connected to client device 105 via a communications link such as network 115. Network 115 may refer to any structure that facilitates electronic communication between multiple components and may operate using wired or wireless technology. Network 115 may include communications over the Internet. The communications link may be a standard communication protocol, such as, for example, universal serial bus (USB), Ethernet or IEEE 802.xx.

RIP 145 may be housed within imaging device 110 (see FIG. 1). RIP 145 may be any raster image processor available or known at the time of filing the present application, for converting each print job page 130a to 130n of print job 130 to a rasterized image or other printable format. The conversion of each page 130a to 130n of print job 130 by RIP 145 results in generating a rasterized set of images 160. Rasterized images 160a to 160n (shown as 160a, 160b, 160c and 160n in FIG. 1) correspond to individual pages 130a, 130b, 130c and 130n, respectively, of print job 130. In some example embodiments, the resulting rasterized set of images 160 may be stored in memory 140 for later retrieval by controller 104. In other example embodiments, rasterized images 160a-160n may each be directly sent to print engine 150 for printing without storing. While RIP 145 is depicted in FIG. 1 as being part of imaging device 110, RIP 145 may be a component of client device 105 in other example embodiments. In still other example embodiments, RIP 145 may be a component separate from client device 105 and imaging device 110 but communicatively connected to both client device 105 and imaging device 110 via network 115.

Print engine 150 receives rasterized images 160a-160n associated with print job 130 from RIP 145. As is known in the art, print engine 150 may include a motor, gears, and imaging supplies controlled by controller 135 and utilized for printing an image onto a media sheet passed through imaging device 110.

In one example embodiment of processing print jobs, pages 130a-130n of print job 130 may be transmitted from client device 105 to imaging device 110 through network 115 via imaging driver 120. Additional information, such as, for example, the user's printing preferences or metadata relating to print job 130 may also be sent to imaging device 110. RIP 145 then converts pages 130a, 130b, and 130c to corresponding rasterized images 160a, 160b, and 160c, respectively, and may store these images in memory 140. For purposes of the present disclosure, a print command may be at least an instruction from RIP 145 to print engine 150 for print engine 150 to start printing. The print command indicates that at least one of rasterized images 160a-160n is generated and ready for printing. The additional information indicated by a user of client device 105 or imaging device 110 as well as limitations relating to an imaging capability of imaging device 110 known to controller 135 are considered by controller 135 when printing images 160a-160n.

In the present disclosure, imaging device 110 includes an Advanced Start (AS) function and a Smart Run-Out (SRO) function which, when both enabled, improves a printing performance of imaging device 110. In one example embodiment, the AS and SRO functions are enabled to set a default printing performance of imaging device 110. It is to be understood that while the AS and SRO functions are depicted in FIG. 1 as blocks of instructions stored in memory 140, the AS and/or SRO functions may be instructions stored in a storage medium remotely located from imaging device 110 and communicatively connected to imaging device 110 via controller 135.

The AS function includes one or more instructions for sending a start command to print engine 150 upon receipt of a print job in RIP 145. In doing so, print engine 150 is ready to print the images associated with the print job in time for the generation of images in RIP 145 to be complete. When enabled, the AS function pre-starts print engine 150 as RIP 145 generates images for each page of the received print job. In having print engine 150 fully powered on or before RIP 145 completely generates an image of the received print job, a printing performance of imaging device 110 is improved by specifically decreasing the amount of time it takes to produce a printed copy or the time to first print.

The SRO function may include a sequence of instructions for preventing print engine 150 from shutting down or turning off while a print job is still being processed by RIP 106 or upon determining that a new print job is received by RIP 145. In some example embodiments, print engine 150 may include instructions for sending a request to RIP 145 for a status thereof (e.g., an SRO request) in order to determine whether or not RIP 145 is busy or not in processing print job 130. When enabled, the SRO function helps improve the printing performance of imaging device 110 by increasing a throughput of print engine 150.

Raster image processors in current image forming devices typically wait for one or more problems to be resolved prior to completing the printing operation which may contribute to the excessive churn. For example, RIP 145 may wait for print job 130 to be transmitted from client device 105 to imaging device 110 no matter the quality or condition of network 115. In another example embodiment, RIP 145 may continue to generate images for each job page no matter how problematic the page is or the length of time spent on the image generation. Print engine 150 may also be warmed up longer while waiting for an image to be received from RIP 145. Any of these aforementioned scenarios may not only cause the churn but also eventually contribute to causing wear and reducing the life of imaging components and/or supplies.

Figure 2:
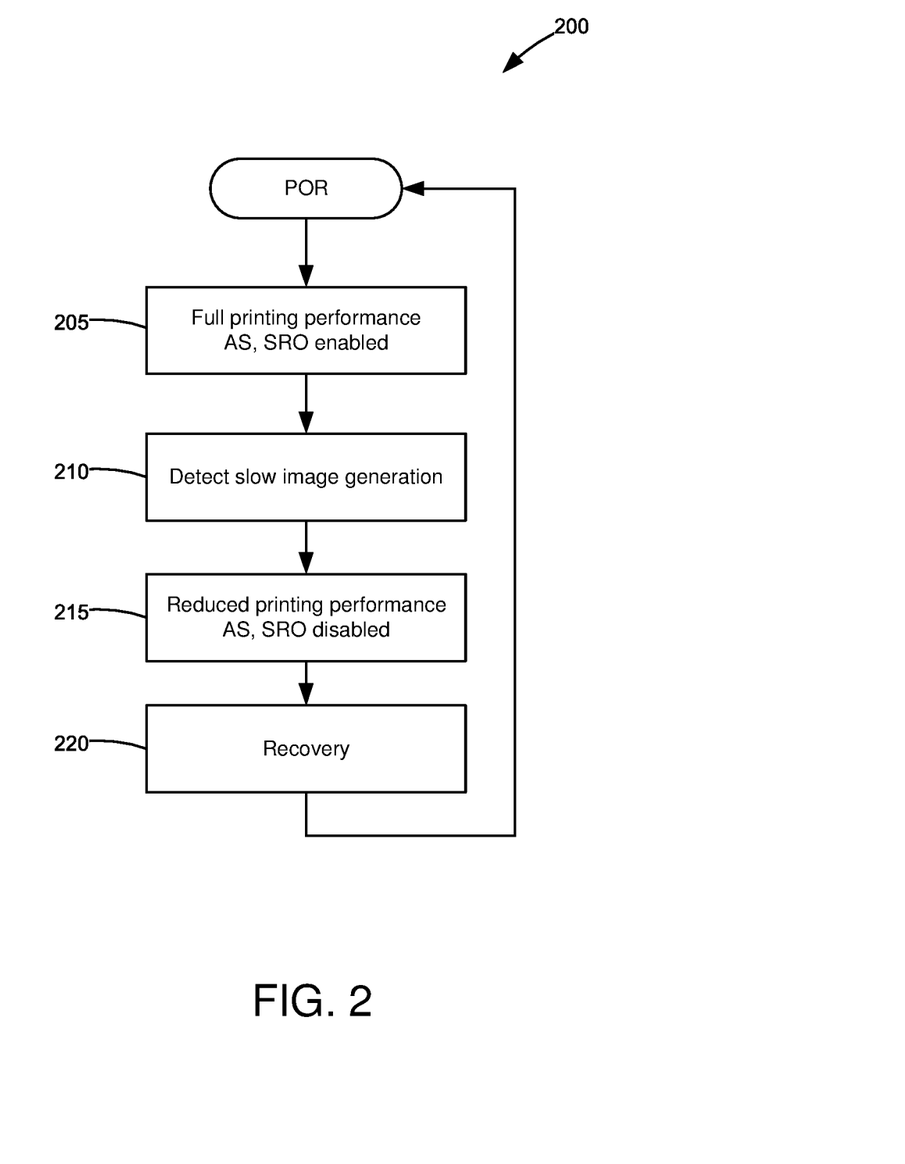
FIG. 2 is a flowchart including a method of adjusting printing performance in an imaging device based on a presence of excess churn, according to one example embodiment.

FIG. 2 is a flowchart of one example method 200 of adjusting the printing performance of imaging device 110 of FIG. 1 based on a presence of excess churn. Example method 200 includes powering imaging device 110 to a full printing performance, detecting a slow image generation causing the excess churn, reducing the printing performance by disabling the AS and SRO functions, and enabling the AS and SRO functions when it has been determined that imaging device 110 has recovered from the slow image generation.

In one example embodiment, imaging device 110 may be powered on initially or from being not in use for over a period of time (also known as a "power on reset"). In other example embodiments, imaging device 110 may be in an idle state where imaging device 110 is waiting to receive a print job from client device 105 (also known as a "sleep" or "standby" mode).

At block 205, following power on reset of imaging device 110 or receipt of a print job (in the context where imaging device 110 is in idle state), controller 135 may set the performance of imaging device 110 to full printing performance. In a full printing performance, both the AS and SRO functions are enabled in imaging device 110 in order to decrease the time to first print and to increase throughput of imaging device 110.

At block 210, either RIP 145 or print engine 150 may detect excess churn generally caused by slow image generation. Slow image generation may be caused by at least one of the following scenarios: (1) when RIP 145 detects problems in network 115; (2) when RIP 145 processes a problematic print job and/or job page(s); and/or (3) when print engine 150 waits for a print job page image from RIP 145 (i.e., a job page image is not ready for printing onto a media sheet when print engine 150 is available and ready to print it). Problems of network 115 may include, but are not limited to, a low bandwidth or extreme traffic along the communication path, such as collisions, lost packets, etc. A problematic print job and/or job page(s) may refer to print jobs that are in a format which cannot be processed by RIP 145 or pages that may be too complex for RIP 145 to process. Print engine 150 may detect slow image generation when a job page image from RIP 145 associated with a print job is not ready in time for printing onto a media sheet by print engine 150.

At block 215, controller 104 reduces the printing performance of imaging device 110 to address the churn detected at block 210. Reducing the printing performance of imaging device 110 includes disabling at least one of the AS and SRO functions in imaging device 110. In one example embodiment, print engine 150 may not respond to (i.e., it may ignore) the AS command from RIP 145. Alternatively or in addition, print engine 150 may not send the SRO request to RIP 145. In a second example embodiment, RIP 145 may not send an AS command to print engine 150. Alternatively or in addition, RIP 145 may indicate to print engine 150 of its "not busy" status or ignore an SRO request from print engine 150.

As a result of disabling the AS function, imaging device 110 may incur a relatively slower time to first print than when print engine 150 automatically prints a print job once completed in RIP 145. As a result of disabling the SRO function, the throughput of print engine 150 is also relatively less than when the SRO function is enabled because print engine 150 would be stopped and restarted every time following a print job.

At block 220, RIP 145 or print engine 150 may then detect recovery of imaging device 110 from the churn detected at block 210 while imaging device 110 is operated at the reduced printing performance. Detecting recovery may include determining whether or not the churn detected from block 210 still exists following a predetermined number of print jobs or images being processed. Detecting recovery may further include determining whether or not adequate bandwidth is available in the communication path.

In one example embodiment where the churn is detected in RIP 145, RIP 145 may include instructions to detect whether the communications link between imaging device 110 and network 115 is being utilized at full bandwidth and to determine whether problematic jobs still exist following the processing of a predetermined number of print job pages. In another example embodiment where the churn is detected in print engine 150, print engine 150 may include instructions to determine whether or not, following the printing of a predetermined number of print job images, the print job images are received by print engine 150 from RIP 145 just in time, i.e., as soon as print engine 150 is ready for printing.

Figure 3A:
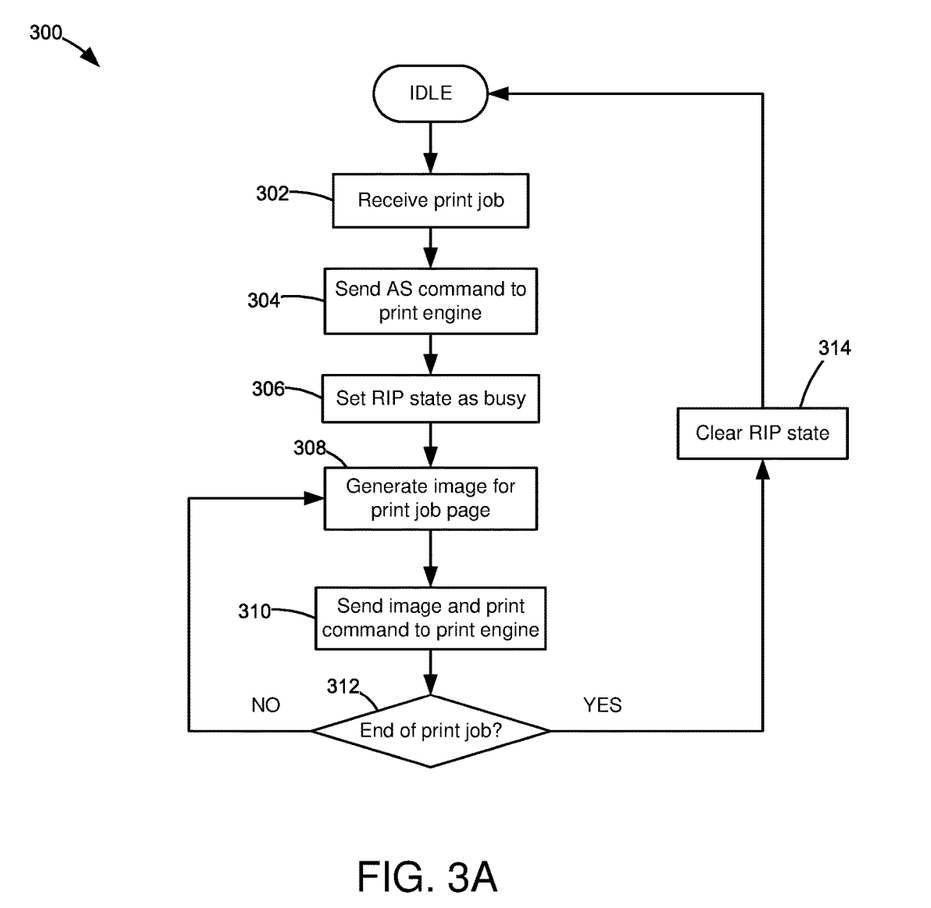
FIG. 3A is a flowchart showing a method for processing a print job in a raster image processor, according to a first example embodiment.
Figure 3B:
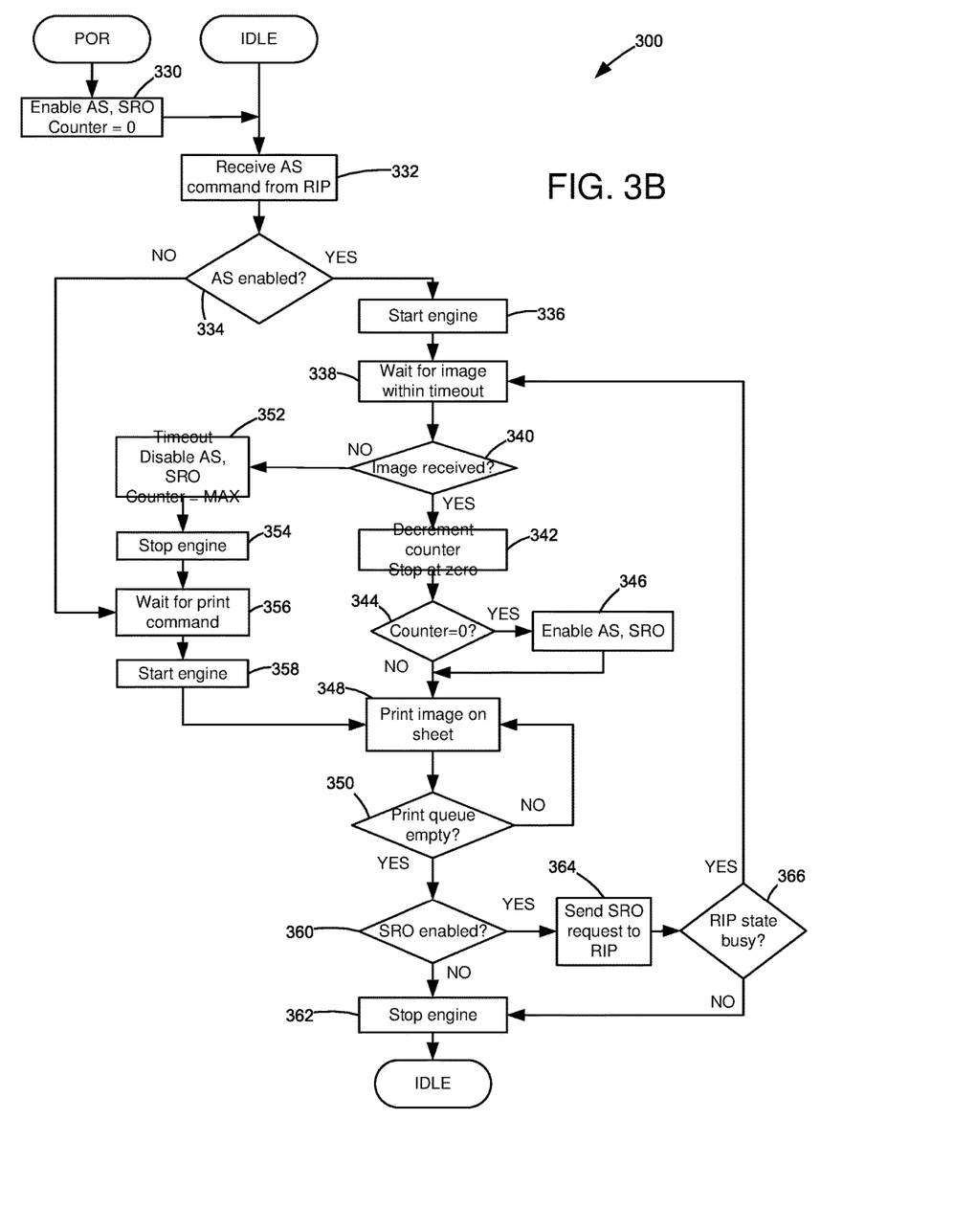
FIG. 3B is a flowchart depicting one example method for processing a print job in a print engine, performed in conjunction with the example method in FIG. 3A.
Figure 4A:
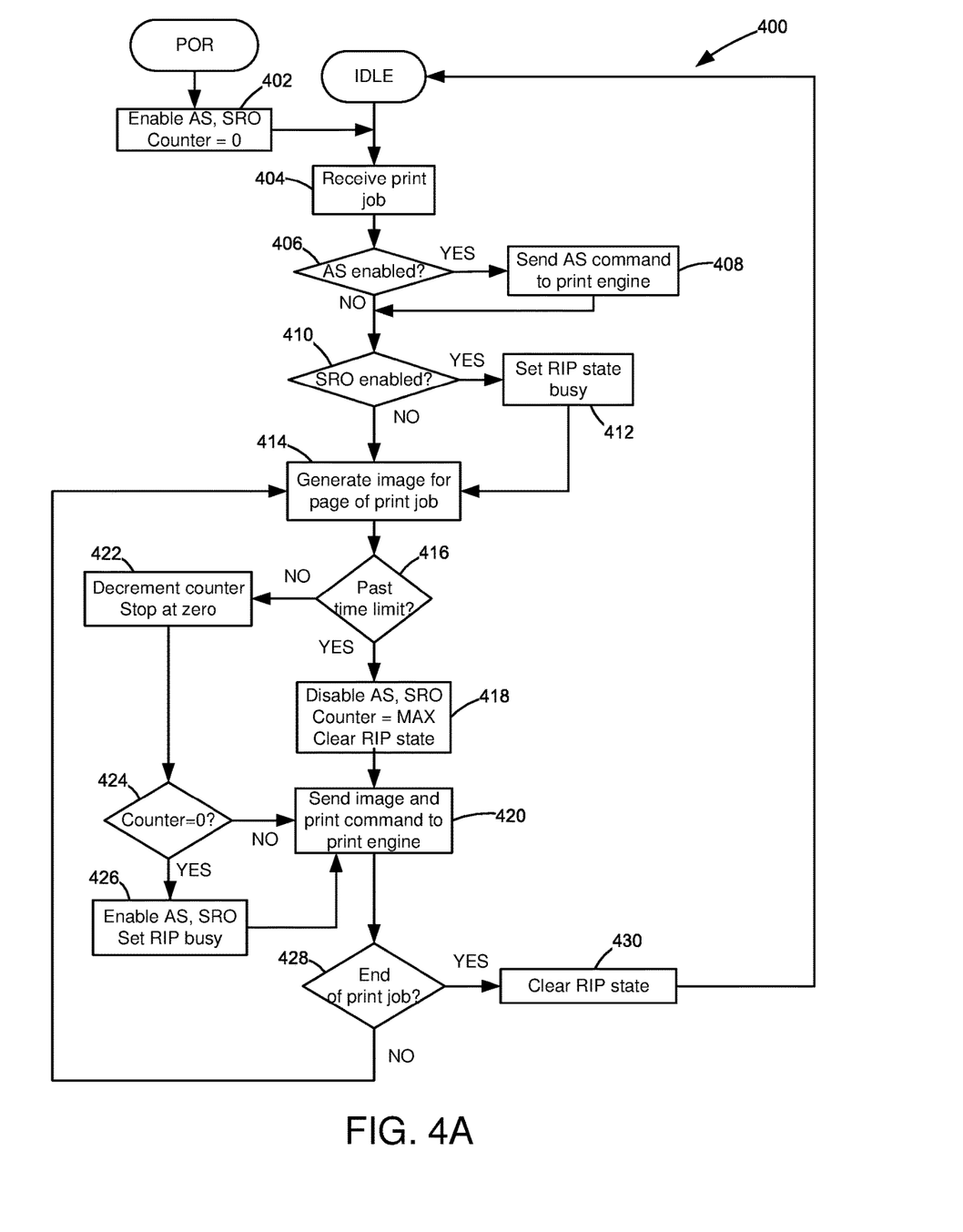
FIG. 4A is a flowchart showing a method for processing a print job in a raster image processor, according to a second example embodiment.
Figure 4B:
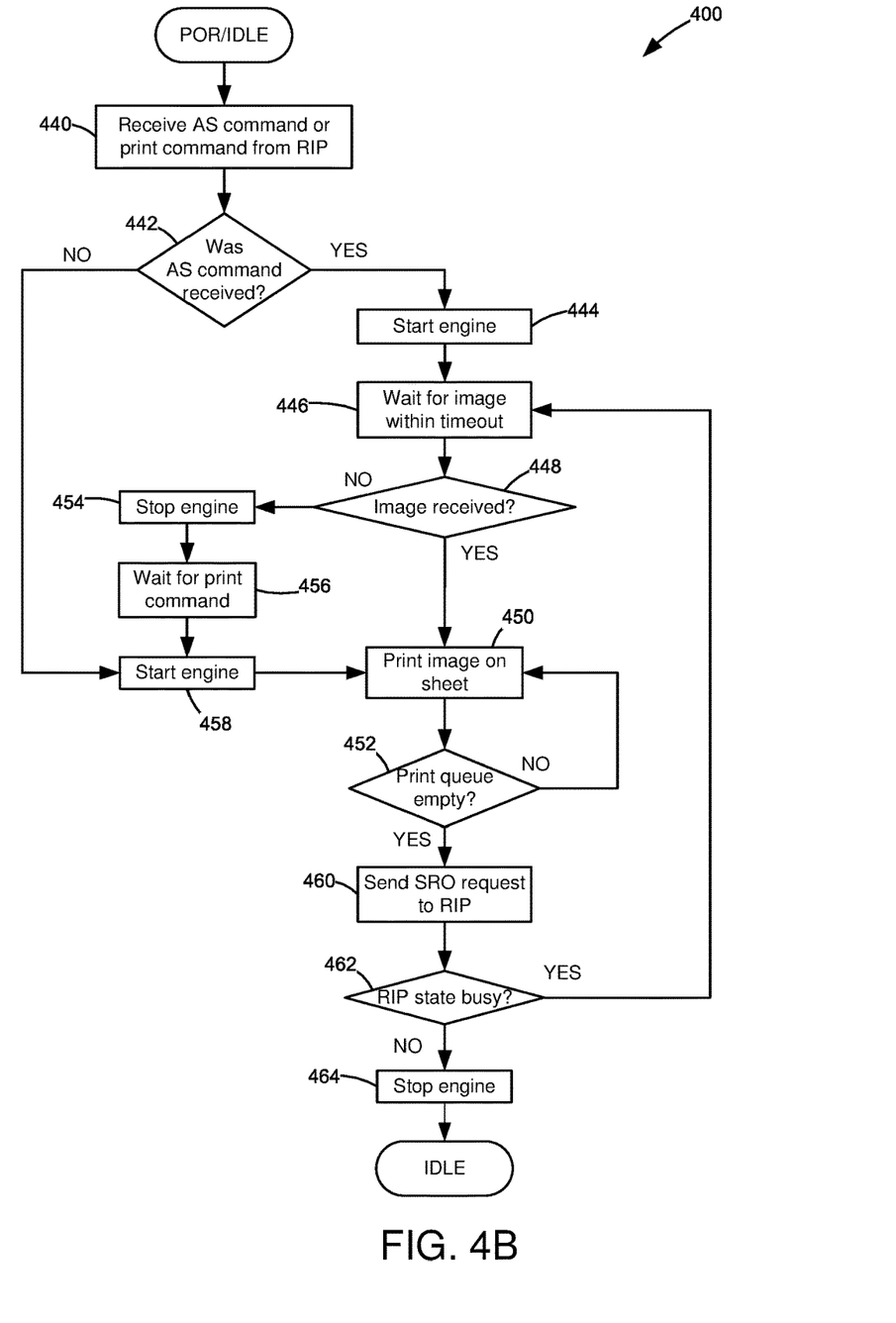
FIG. 4B is a flowchart depicting one example method for processing a print job in a print engine, performed in conjunction with the example method in FIG. 4A.

FIGS. 3A and 3B show a first example method 300 of the present disclosure where print engine 150 manages the excess churn. FIGS. 4A and 4B show a second example method 400 of the present disclosure where RIP 145 manages the excess churn. As is known in the art, processes performed by RIP 145 and by print engine 150 are separate complementary processes such that example methods 300 and 400 are each split into two parts: FIGS. 3A and 4A include actions that are performed by RIP 145 while FIGS. 3B and 4B include actions that are performed by print engine 150 in conjunction with the actions in FIGS. 3A and 4A, respectively. It will be appreciated that in the present disclosure the actions performed in FIG. 3A may be performed simultaneously with the actions in FIG. 3B and that the actions performed in FIG. 4A may be performed simultaneously with the actions in FIG. 4B.

Reference will now be made with respect to first example method 300 in FIGS. 3A and 3B. Example method 300 may include print engine 150 receiving the images from RIP 145, detecting slow image generation causing the churn, and based on the slow image generation, disabling the AS function by not responding to or ignoring an AS command from RIP 145 (between blocks 334 and 356 of FIG. 3B), disabling both AS and SRO functions when an image is not received within a predetermined timeout (block 352, FIG. 4B), and disabling the SRO function by not sending an SRO request to RIP 145 (between blocks 360 and 362, FIG. 3B). It will be noted that FIG. 3A includes actions that are known in the field of generating images for print job pages.

Referring to FIG. 3A, imaging device 110 may initially be set in an idle state. In response to receipt by RIP 145 of a print job from client device 105 (block 302), RIP 145 may send an AS command to print engine 150 at block 304 (print engine 150 may receive the same AS command at block 332 in FIG. 3B). At block 306, RIP 145 sets a status thereof to "busy" as a consequence to receiving the print job. At block 308, RIP 145 may generate an image corresponding to a first page of the print job. Then, at block 310, RIP 145 may send the generated image to print engine 150 along with a print command. Print engine 150 then determines whether this same generated image is received from RIP 145 at block 340 in FIG. 3B.

Referring back to FIG. 3A, RIP 145 may then determine (at block 312) whether or not the image generated at block 308 corresponds to a last page of the print job. At block 314, if the image generated from block 308 does correspond to the last page of the print job, RIP 145 then clears its status and indicates to print engine 150 that RIP 145 is not busy processing any print job pages (the status being indicated as a response to an SRO request of print engine 150 at block 336 in FIG. 3B). Imaging device 110 may then return to idle state where RIP 145 is in standby mode for another print job. In the event that RIP 145 determines that the print job includes a subsequent page, RIP 145 generates an image corresponding to the subsequent page of the print job (returning to block 308) and sends the generated image to print engine 150 (block 310). Actions in blocks 308 and 310 are repeated for all other subsequent pages of the print job. When repeating actions in blocks 308 and 310, the RIP state of RIP 145 is maintained as busy.

FIG. 3B includes blocks 330-366 that are performed by print engine 150 in conjunction with blocks 302-314 in FIG. 3A described above. At block 330, following a POR of imaging device 110, print engine 150 may enable the AS and SRO functions. At block 332, print engine 150 may receive an AS command from RIP 145 which is sent by RIP 145 at block 304 in FIG. 3A.

At block 334, print engine 150 may determine whether or not the AS function is enabled in imaging device 110. In one aspect, determining whether or not the AS function is enabled may depend on whether or not the AS function has been disabled while processing a previous print job prior to the transition of imaging device 110 to an idle state. At block 336, upon a determination that the AS function is enabled, print engine 150 is powered up and, in particular, starts operating (i.e., transitions to a printing state). Then, at block 338, print engine 150 waits for a job page image or any print-job related information from RIP 145. Block 338 may be performed within a predetermined timeout such as, for example, 5 seconds. At block 340, print engine 150 may determine whether or not a job page image is received from RIP 145, as sent by RIP 145 at block 310 in FIG. 3A.

Still referring to FIG. 3B, upon receipt of an image from RIP 145, print engine 150 may print the received job page image onto a corresponding media sheet at block 348. At block 350, print engine 150 then determines whether or not other job page images for printing exist and, if so, print engine 150 again performs block 348 where print engine 150 prints each of the other images received from RIP 145 onto corresponding media sheets, per blocks 308 and 310 in FIG. 3A.

Referring back to block 334, upon a determination by print engine 150 that the AS function is not enabled, print engine 150 may not respond to the AS command sent by RIP 145 (per block 304, FIG. 3A). Instead print engine 150 may proceed to block 356 where print engine 150 waits for a print command prior to starting up. In waiting for the print command, printing is held off and, with the printing time being dependent upon receipt of a print command, a time to first print in imaging device 110 may be increased.

At block 340, in an example context where print engine 150 did not receive any job page image from RIP 145 following the predetermined timeout period, print engine 150 may disable the AS and SRO functions (block 352). At block 354, print engine 150 may be stopped following the processing of a first print job and imaging device 110 may be returned to the idle state. At block 356, print engine 150 may wait for a print command prior to starting up (block 358). When a job page image is in queue for printing, print engine 150 prints the job page image (block 348) and determines whether or not all other images associated with the print job have been printed (block 350). If other print job images have not been printed, print engine 150 prints each of the other images received from RIP 145 per blocks 308 and 310 in FIG. 3A prior proceeding to block 360 in FIG. 3B.

At block 360, when all the images that are queued for printing by print engine 150 have been printed, print engine 150 may then determine whether or not the SRO function is enabled in imaging device 110. At block 362, when the SRO function is determined to be disabled, print engine 150 may be stopped prior to setting imaging device 110 to an idle state, and an SRO request may not be sent from print engine 150 to RIP 145. At block 364, when the SRO function is determined to be enabled, print engine 150 may send an SRO request to RIP 145 to determine whether or not it should shut down following printing the print job. At block 366, print engine 150 then determines whether or not RIP 145 is busy based upon a status set by RIP 145 at time when the SRO request is sent. Upon a determination that RIP 145 is busy processing images of the same print job or images of a new print job (based on blocks 306 to 312 in FIG. 3A), print engine 150 again performs blocks 338 to 360. If, at block 366, print engine 150 determines that RIP 145 is not busy or that a status thereof is clear (based on block 314 in FIG. 3A), then print engine 150 may inform controller 135 to set imaging device 110 to an idle state.

In one example embodiment, a counter value may be used as a basis is determining whether or not the AS and SRO functions are to be enabled following a period where a normal printing operation is observed while the AS and SRO functions are disabled. The counter value may be set to a first value (e.g., zero) following POR and to a second value every time the AS and SRO functions are disabled. The counter value may be regularly updated following every instance that an image is being processed by print engine 150 without any delay or drawback. In one example embodiment of the present disclosure, a counter value is set to the second value (i.e., predetermined MAX count) upon the detection of churn and is updated every time that an image is processed without any problems until the second value equals the first value.

In particular, and with reference to block 352 of FIG. 3B, where the AS and SRO functions are disabled based upon the image being not received from RIP 145 within the predetermined timeout, print engine 150 may accordingly set the counter value to the second predetermined maximum value prior to stopping print engine 150. At block 342, the counter value may be decremented every time an image is received within the timeout until the second value is determined to reach its initial value (zero) following POR (see block 330). At block 344, print engine 150 may then determine whether or not the counter value reached the initial value following POR, and if so, at block 346, print engine 150 re-enables the AS and SRO functions prior to printing the image (block 348). Other alternative methods for tracking a number of times that an image is generated and/or received on time may be apparent to those skilled in the art.

Reference will now be made with respect to second example method 400 in FIGS. 4A and 4B. Example method 400 may include RIP 145 receiving a print job from client device 105, detecting slow image generation causing the churn, and based on the slow image generation, disabling the AS function by not sending an AS command to print engine 150 (between blocks 406 and 410 of FIG. 4A) and disabling the SRO function by indicating to print engine 150 that no jobs are being processed or ignoring an SRO request from print engine 150 (between blocks 410 and 414 of FIG. 4A).

At block 402, following a POR of imaging device 110, RIP 145 may enable the AS and SRO functions. At block 404, where imaging device 110 is powered on after being idle, RIP 145 may receive a print job from client device 105. At block 406, RIP 145 may determine whether or not the AS function is enabled based upon a presence of churn or a previous status of the function on imaging device 110. At block 408, upon a determination that the AS function is enabled, RIP 145 may send an AS command to print engine 150 for preparing print engine 150 for printing. (The same AS command is received by print engine 150 at block 440 of FIG. 4B). Otherwise, upon a determination that the AS function is disabled, no AS command may be sent from RIP 145 to print engine 150, and RIP 145 may proceed to performing block 410 following block 406.

Continuing with FIG. 4A, following blocks 406 and 408, RIP 145 may determine whether or not the SRO function is enabled at block 410. At block 412, if the SRO function is enabled, RIP 145 may set the status thereof as "busy" for print engine 150 to refer to when an SRO request is received by RIP 145 from print engine 150 (block 460 in FIG. 4B). Otherwise, when the SRO function is disabled, RIP 145 may either indicate in response to the SRO request of print engine 150 (block 460 of FIG. 4B) that it is not busy processing any print jobs or ignore any SRO request from print engine 150 (also block 460 of FIG. 4B) so as to cause print engine 150 to shut down following processing of the print job.

Referring back to FIG. 4A, following blocks 410 and 412, at block 414, RIP 145 generates an image corresponding to the first page of the print job. At block 416, RIP 145 may determine whether the image is generated past a set time limit. If the image is generated past a set limit, RIP may disable the AS and SRO functions at block 418. Additionally, at block 418, RIP 145 may clear a status thereof and indicate this change in status when an SRO request is received from print engine 150 (also block 460 of FIG. 4B). At block 420, RIP 145 then sends the generated image to print engine 150 along with a print command for starting up.

Similar to at least blocks 340, 342, and 344 in FIG. 3B, a counter value may be used as a basis in determining whether or not to maintain the AS and SRO functions as disabled or have them enabled. Referring back to block 416 in FIG. 4A, upon a determination that the image is generated within the time limit, RIP 145 may decrement the counter value for tracking the instance when the image is generated within the time limit (block 422). At block 424, RIP 145 may determine whether or not the counter value reached the initial value (e.g., zero) set following POR. At block 426, upon a determination that the counter value has reached the initial set value, RIP 145 may enable the AS and SRO functions and set a status thereof as busy for reference by print engine 150 when print engine 150 sends an SRO request (see block 460 of FIG. 4B). Upon a determination that the counter value did not reach the initial value or following block 426, RIP 145 may send the image generated from block 414 to print engine 150 along with a print command for printing the image (block 420). This same image is received by print engine 150 in block 448 of FIG. 4B.

Continuing with FIG. 4A, RIP 145 may determine (block 428) whether or not the image generated at block 414 corresponds to a last page of the print job. If the image corresponds to the last page of the print job, RIP 145 may clear a status thereof prior returning imaging device 110 to an idle state at block 430. This updated status of RIP 150 may be indicated to print engine 150 when an SRO request (per block 460, FIG. 4B) is made. Otherwise, upon a determination that the print job includes additional pages, RIP 145 again performs blocks 414 to 420 until a last page of the print job is determined.

Reference is now made to blocks 440-464 in FIG. 4B, which are performed in conjunction with blocks 402-430 in FIG. 4A. It will be noted that FIG. 4B includes actions that are known in the field of printing job page images.

At block 440, where imaging device 110 is either initially powered on or powered on after being idle, print engine 150 may receive a print command or an AS command from RIP 145. The AS command and the print command may be sent by RIP 145 at blocks 408 and 420 in FIG. 4A, respectively. At block 442 of FIG. 4B, print engine 150 may then determine whether or not an AS command is received. At block 444, upon a determination that an AS command is received, print engine 150 may start operating at a printing state. At block 446, print engine 150 waits for an image generated by RIP 145 at block 420 in FIG. 4A. Similar to block 338 in FIG. 3B, block 446 in FIG. 4B may be performed within a predetermined timeout period. At block 448, print engine 150 may determine whether or not a job page image is received and if so, prints the job page image (block 450). Upon a determination at block 448 that the image is not received on time or that no image is received within the timeout period from RIP 145, print engine 150 may be stopped (block 454) and imaging device 110 may be set to an idle state. At block 456, print engine 150 may be configured to wait for a print command (which may be from block 420 in FIG. 4A) prior to starting up (block 458).

Following block 450, at block 452, print engine 150 may then determine whether the print queue is empty or whether more job page images are to be printed. At block 460, upon a determination that the print queue is empty, print engine 150 may send an SRO request to RIP 145. At block 462, print engine 150 may determine whether or not RIP 145 is busy based on information received from the request sent at block 460. Such information on the status of RIP 145 may be based on the actions in blocks 412 or 430. When RIP 145 is busy processing other print job pages, print engine 150 may repeat the actions in blocks 446 to 460. At block 464, upon a determination that RIP 145 is not busy based on a status of RIP 145 when the SRO request is sent (block 412 or 430 in FIG. 4A), print engine 150 may be stopped, and imaging device 110 may be returned to idle state.

It will be appreciated that the actions described and shown in the example flowcharts may be carried out or performed in any suitable order. It will also be appreciated that not all of the actions described in FIGS. 2, 3A-3B, and 4A-4B need to be performed in accordance with the example embodiments and/or additional actions may be performed in accordance with other example embodiments of the disclosure.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for reducing component wear in an imaging device, the imaging device having a controller in communication with memory having stored instructions to cause the controller to send a start command to a print engine upon receipt of a print job by a raster image processor and for the controller to prevent the print engine from shutting down while the raster image processor processes the print job, comprising:
    receiving the print job at the imaging device;
    generating an image for each page of the print job;
    printing each image;
    determining whether an image generation during at least one of the receiving, the generating, and the printing is slow; and
    upon a positive determination, disabling one or both of the stored instructions to adjust a default printing performance of the imaging device.

2. The method of claim 1, further comprising tracking a number of times that the at least one of the receiving, the generating, and the printing is not slow for comparison with a predetermined limit and reverting a printing performance of the imaging device to the default printing performance when the number of time exceeds the predetermined limit.

3. The method of claim 1, wherein the disabling the one or both stored instructions to adjust the default printing performance results in at least one of increasing a time to first print of the imaging device and reducing a print throughput of the imaging device.

4. The method of claim 1, wherein the disabling the one or both stored instructions to adjust the default printing performance results in waiting for a print command prior to printing each image.

5. The method of claim 1, wherein the disabling the one or both stored instructions to adjust the default printing performance results in transitioning the imaging device into an idle state following printing an image of the print job regardless of whether a second print job is received in the imaging device.

\* \* \* \* \*